Patented Jan. 8, 1929.

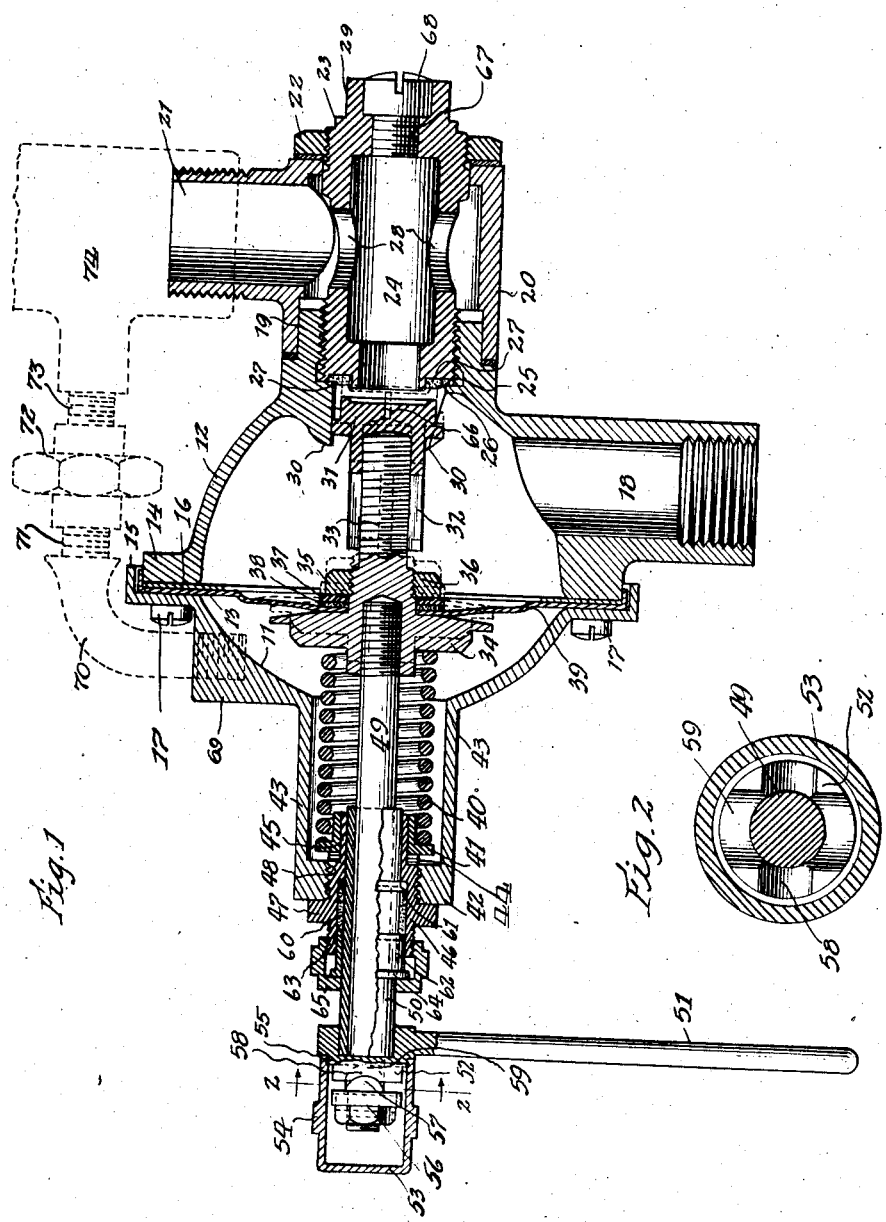

1,698,155

UNITED STATES PATENT OFFICE.

PARMER DORSEY, OF WICHITA, KANSAS, AND ROBERT D. McINTOSH, OF RIVER FOREST, ILLINOIS, ASSIGNORS TO THE IMPERIAL BRASS MANUFACTURING COMPANY, OF CHICAGO, ILLINOIS, A CORPORATION OF ILLINOIS.

PRESSURE-RELEASE VALVE.

Application filed August 12, 1921. Serial No. 491,651.

Our invention is concerned with pressure valves, and more especially with safety valves in which the valve is opened automatically and the pressure released in case it passes above a certain point, and it is concerned primarily with such a valve having also a manual release for the spring pressure, so that every time it is operated manually to relieve the spring pressure the safety valve will be unseated, thereby insuring that it will not be stuck if it is ever called upon to function as a safety valve.

Our invention is finally concerned with a pressure release valve so constructed that whenever the valve is opened manually it is positively lifted from its seat to prevent any possibility of its sticking.

To illustrate our invention, we have annexed hereto a sheet of drawings, in which the same reference characters are used to designate identical parts in all the figures, of which—

Fig. 1 is a central longitudinal section through the valve with the handle turned so that the pressure is released; and Fig. 2 is a view in section on the line 2—2 of Fig. 1.

In carrying out our invention in its preferred form, we employ a valve casing consisting of two halves, 11 and 12, each half being circular in cross-section throughout most of its length and the two castings having their adjacent ends hollowed out to form a chamber on each side of the diaphragm 13, which is clamped between the annular flange 14 carried by the portion 12 of the casing and the annular flange 15 carried by the other portion, and preferably overhanging the same as shown, the two halves being clamped together with the periphery of the diaphragm 13 and the annular gasket 16 being clamped between them by the screws 17. The casing 12 is provided with the internally threaded inlet 18, preferably extending radially therefrom, and located on the casing concentrically with the axis thereof is the annular seat or flange 19 on which is adjusted in any desired position the outlet sleeve 20, which has the threaded outlet aperture 21 on one side thereof, which aperture can be directed at any desired angle to the inlet 18 by simply turning the sleeve on its seat, where it is secured by the lock-nut 22 co-operating with the threads 23 on the outer end of the hollow plug 24, the threaded inner end of which is screwed into the outlet passage formed in the casing 12 and which is preferably seated against the small annular flange 25 formed at the end of the passage in which the plug 24 is screwed. An annular channel 26 is formed in the inner end of the plug and has seated therein the annular flange seat 27 which is composed of rubber or some similar substance or composition. The hollow cylindrical plug 24 has the openings 28 in its sides so that the gas can pass out through the port 21 in any position of the plug which has it outer end 29 made square or hexagonal, so that a wrench can be applied thereto. The inner face of the chamber in the casing 12 has formed thereon the three projections 30 which serve to guide the valve 31 to its seat 27, this valve preferably taking the form of a sharp flange on the edge of a disk secured on the internally threaded split sleeve 32. This sleeve after it is split is deformed slightly by permanently compressing its end so that the split is narrowed at its outer end so that as it is adjusted on the reduced threaded end 33 of the diaphragm engaging plug as hereinafter described, it cannot accidentally turn and destroy the adjustment. This diaphragm-engaging plug has the disk-shaped end 34 with its face adjacent the diaphragm 13 curved as shown, to co-operate with the diaphragm, which is held against it by the lock-nut 35 screwed on the threaded portion 36 and engaging the washer 37, which in turn engages the packing ring 38 which is thus clamped against the diaphragm 13. The convex face of the disk 34 is shaped so that when it is forced toward the valve seat, the diaphragm 13 will be compelled to assume the position shown in dotted lines in Fig. 1, in which position the diaphragm has been swung past the central position by binding the same slightly at the annular offset 39, which is provided in the diaphragm for this purpose. With this construction of the diaphragm, it tends to remain either in the full line or the dotted line positions shown in Fig. 1.

For the purpose of applying any desired pressure to the outer face of the diaphragm 13, i. e., the one in the portion 11 of the casing, we preferably employ the helically coiled expanding spring 40 which is interposed between the adjacent face of the disk 34 and the annulus 41, angular in cross-section, which is spaced at any desired distance from the end 42 of the cylindrical extension 43 of the half 11 of the casing by the washers 44, and it will be understood that as many of these washers 44 are employed as are necessary to secure the desired tension of the spring 40 when the valve 31 is in contact with its seat 27. The annulus 41 is preferably supported on the reduced portion 45 of the sleeve 46, which has the hexangular central portion 47 to which a wrench may be applied, and which has its threaded portion 48 screwed into the correspondingly threaded end 42. By varying the number or thickness of the washers 44 it will be obvious that the tension of the spring 40 may be increased or diminished to furnish any desired pressure on the diaphragm 13.

The mechanism thus far described furnishes a safety release valve, but in order that the same may be released manually, we preferably provide the following mechanism: Threaded into a recess in the center of the disk 34 is the end of the rod 49, which fits loosely in and extends through the sleeve 50 which has the handle 51 rigidly secured near the outer end thereof. The handle has the annular extension 52 projecting therefrom into the cylindrical cap 53 provided with the hexagonal flange 54 to which a wrench may be applied to screw the cap on to the threads 55 provided on the handle adjacent the extension 52. The rod 49 has rigidly secured on its threaded outer end the nut 56, which is provided with a pair of diametrically opposed lugs 57 preferably substantially semi-circular in cross-section and designed to co-operate either with the shallow recesses 58 or with the deeper recesses 59 formed in the outer face of the extension 52, preferably at right angles to the recesses 58. When the valve is in operation, the handle 51 is turned at right angles to the position shown in Fig. 1, in which position the lugs 57 enter the deep recesses 59 and allow the spring 40 to force the valve 51 into engagement with the valve seat 27. When the pressure is to be released, the handle 51 is turned to the full line position of Fig. 1, where the lugs 57 engage the shallow recesses holding the valve out of engagement with its seat. We prefer to make the chamber in the half 11 of the casing airtight, so as to prevent the escape of gas into the room, if the diaphragm 13 should be ruptured, and for this purpose, we place packing 60 within the sleeve 46, and this packing is forced into the angle 61 formed in the inner end of the sleeve 46 by the collar 62, which has at its inner end the similar angle 63 and at its outer end a flange 64 which is engaged by the gland nut 65 which is screwed on to the threaded outer end of the sleeve 46.

As it is desirable to adjust the position of the valve 31 relative to its seat and the diaphragm without disassembling the casing, for this purpose we provide in the center of the valve disk 31 the slot 66, which is adapted to receive the working end of a screw-driver, which can be inserted through the aperture 67 formed in the outer end of the plug 34 when the closing screw 68 threaded therein has been removed for this purpose.

The operation of the foregoing valve will be readily apparent. Assuming that the parts are in the position shown in dotted lines in Fig. 1, and that the pressure of the gas reaches the danger point, this pressure will lift the valve 31 against the pressure of the spring 40 without entirely freeing it from its seat until the diaphragm 13 has been moved past its center, at which time the spring action of the diaphragm serves to augment the pressure of the gas which has been sufficient to counterbalance the pressure of the spring 40, so that the spring action serves to move it suddenly clear of the seat 27 and allows the valve to open wide and the gas to be released rapidly, instead of slowly in the manner in which the ordinary relief valve operates. When the handle 51 is turned to the full line position shown in the drawings, the valve 31 is positively drawn away from its seat against the resistance of the spring 40, thereby opening it widely and securing a very quick release of the pressure.

Under some conditions, we may prefer to connect the chamber in the half 11 of the casing with the outlet 21, as indicated in dotted lines, where a boss 69 is formed on the half 11 of the casing, and has the elbow 70 screwed therein and connected by the short threaded pipe 71 with the union 72, which in turn is connected by the short threaded pipe 73 with the T 74 which is threaded on to the outlet 21. This by-pass construction, in case of a rupture of the diaphragm 13 permits the gas, which would otherwise tend to leak out into the room, to flow freely into the outlet pipe which will be connected with the T 74.

While we have shown and described our invention as embodied in the form which we at present consider best adapted to carry out its purposes, it will be understood that it is capable of modifications, and that we do not desire to be limited in the interpretation of the following claims, except as may be necessitated by the state of the prior art.

What we claim as new and desire to secure by Letters Patent of the United States is:

1. In a pressure operated release valve, the combination with a casing, of a diaphragm covering a chamber in said casing, an inlet to said chamber, an outlet for the chamber associated with said casing, a valve seat in said outlet, a valve co-operating with the seat, means for applying any desired pressure to the outside of the diaphragm, and threaded connections between the valve and the diaphragm comprising an internally threaded split sleeve carried by one of them deformed onto a threaded bolt on which it is screwed carried by the other.

2. In a pressure operated release valve, the combination with a casing, of a diaphragm forming one side of a chamber in said casing, an inlet to said chamber, adapted when in use to be connected to a pipe, an outlet passage from the chamber embodying an intermediate portion whose axis is at right angles to the face of the diaphragm, and a final outlet portion extending at an angle to the intermediate portion and adapted when in use to be connected to a pipe, a hollow member carrying at its inner end a valve seat secured in said intermediate portion, a valve cooperating with said seat and provided with means for engagement by an adjusting tool, means for applying any desired pressure to the outside of the diaphragm, a stud projecting from the center of the diaphragm upon which the valve is threaded tightly to prevent any movement thereon when the valve is in use, although permitting the valve to be turned thereon for adjustment to and from the diaphragm by an adjusting tool applied thereto, and a gas tight plug removably secured in the hollow member in axial alinement with the valve and stud so that by removing the plug the valve can be adjusted to and from the diaphragm without disconnecting any of the connected piping or displacing the valve seat.

3. In a pressure operated release valve, the combination with a casing, of a diaphragm interposed between two chambers in said casing, an inlet to one of said chambers, an outlet for the same chamber associated with said casing, a valve seat in said outlet, a valve co-operating with the seat and connected to the diaphragm, a spring for applying any desired pressure to the other side of the diaphragm located in the other chamber, a rotatable sleeve extending through said other chamber, a rod inside of the sleeve and extending through the spring to the diaphragm, a cam lug on the outer end of the rod, a cam depression in the outer end of the sleeve co-operating therewith and a handle attached to the sleeve for rotating it, substantially as and for the purpose described.

4. In a pressure-operated release valve, the combination with a casing, of a diaphragm covering a chamber in said casing, an inlet to said chamber, an outlet for the chamber associated with said casing, a valve seat in said outlet, a valve co-operating with the seat and connected to the diaphragm, a spring for applying any desired pressure to the outside of the diaphragm, a casing for the spring, a handle, a sleeve attached to the handle and rotating therewith, and extending through a packed bearing into the spring casing, and connections between the handle and the spring for quickly compressing the latter and pulling the valve from its seat.

5. In a pressure-operated release valve, the combination with a casing, of a diaphragm secured therein and dividing it into two hermetically separated chambers, an inlet to the first of said chambers, an outlet from the same chamber, a valve seat in said outlet, a valve co-operating with the seat and connected to the diaphragm so as to be moved thereby, means in the second chamber to apply any desired pressure to that side of the diaphragm and tending to keep the valve seated, a sleeve closed at its outer end and extending through a packed bearing into said second chamber, a handle attached to said sleeve to rotate the same, and connections between said handle and the diaphragm enclosed by the sleeve for quickly moving the diaphragm against said pressure means to lift the valve from its seat.

6. In a pressure-operated release valve, the combination with a casing, of a diaphragm secured therein and dividing it into two hermetically separated chambers, an inlet to the first of said chambers, an outlet from the same chamber, a valve seat in said outlet, a valve co-operating with the seat and connected to the diaphragm so as to be moved thereby, means in the second chamber to apply any desired pressure to that side of the diaphragm and tending to keep the valve seated, a sleeve closed at its outer end and extending through a packed bearing into said second chamber, a handle attached to said sleeve to rotate the same, and connections between said handle and the diaphragm enclosed by the sleeve for quickly moving the diaphragm against said pressure means to lift the valve from its seat, said connections consisting of a rod enclosed by the sleeve secured to the diaphragm at one end and having a cam surface at the other end, and a co-operating cam surface carried within the sleeve to move the rod longitudinally when the sleeve is rotated.

In witness whereof, we have hereunto set our hands this 26th day of July A. D. 1921.

PARMER DORSEY.
ROBERT D. McINTOSH.